United States Patent [19]

Griffin et al.

[11] Patent Number: 4,474,001
[45] Date of Patent: Oct. 2, 1984

[54] COOLING SYSTEM FOR THE ELECTRICAL GENERATOR OF A TURBOFAN GAS TURBINE ENGINE

[75] Inventors: James G. Griffin, West Hartford; Frederick M. Schwarz, Glastonbury, both of Conn.

[73] Assignee: United Technologies Corporation, Hartford, Conn.

[21] Appl. No.: 249,766

[22] Filed: Apr. 1, 1981

[51] Int. Cl.³ .............................................. F01P 11/08
[52] U.S. Cl. .................................. 60/204; 60/226.1; 60/267; 60/39.08; 60/39.83
[58] Field of Search ........... 60/39.83, 204, 266, 60/267, 226 R, 39.08, 39.09 F

[56] References Cited

U.S. PATENT DOCUMENTS

| | | | |
|---|---|---|---|
| 2,625,009 | 1/1953 | Leggett et al. | 60/39.08 |
| 2,696,712 | 12/1954 | Lewis | 60/39.83 |
| 2,865,580 | 12/1958 | Marshall | 60/39.08 |
| 2,907,527 | 10/1959 | Cummings | 60/39.08 |
| 2,970,437 | 2/1961 | Anderson | 60/39.18 C |
| 2,986,003 | 5/1961 | Buckingham | 60/39.08 |
| 3,080,716 | 3/1963 | Cummings et al. | 60/39.83 |
| 3,300,965 | 1/1967 | Sherlaw et al. | 60/39.08 |
| 3,779,007 | 12/1973 | Lavash | 60/39.83 |
| 4,151,710 | 5/1979 | Griffin et al. | 60/39.08 |
| 4,163,366 | 8/1979 | Kent | 60/760 |
| 4,354,345 | 10/1982 | Dreisbach, Jr. et al. | 60/39.08 |

FOREIGN PATENT DOCUMENTS 627396 8/1949 United Kingdom .
760243 10/1956 United Kingdom .

Primary Examiner—Carlton R. Croyle
Assistant Examiner—Jeffrey A. Simenauer
Attorney, Agent, or Firm—Gene D. Fleischhauer

[57] ABSTRACT

A cooling system 44 for an electrical generator 42 is disclosed. The cooling system rejects excess heat to the engine fuel through a primary heat exchanger 46 and at low fuel flow rates, supplementarily rejects heat to fan air at a secondary heat exchanger 48 located remotely from the fan duct 30. In one embodiment, the secondary heat exchanger is disposed in a nacelle fan compartment 14. In another embodiment, the secondary heat exchanger is disposed in a nacelle core compartment 16.

5 Claims, 3 Drawing Figures

FIG. I

COOLING SYSTEM FOR THE ELECTRICAL GENERATOR OF A TURBOFAN GAS TURBINE ENGINE

DESCRIPTION

TECHNICAL FIELD

This invention relates to axial flow gas turbine engines and particularly to a system for cooling the electrical generator of such an engine.

BACKGROUND ART

Axial flow gas turbine engines are typically formed of a compression section, a combustion section and a turbine section. Working medium gases are drawn into the compression section where they pass through several stages of compression causing the temperature and the pressure of the gases to rise. The gases are mixed with the fuel in the combustion section and burned to form hot pressurized gases. These gases are a source of energy to the engine and are expanded through the turbine section to produce work.

In fixed wing aircraft, the engine is mounted in a housing attached to the wing of the aircraft commonly referred to as a nacelle. The nacelle both supports and positions the engine with respect to the aircraft. An electrical generator driven by the engine for supplying electric power to the aircraft is located within the nacelle. The production of electric power is accompanied by the production of heat which must be removed to preserve the operating life of the generator. This heat may be removed by lubricating oil passing through the generator. A construction using lubricating oil as the means for removing heat is shown in U.S. Pat. No. 4,151,710 entitled "Lubrication Cooling System for Aircraft Engine Accessory" issued to Griffin et al. The heat is rejected primarily to a heat exchanger extending into a flow path of the engine and secondarily to a heat exchanger in communication with fuel being flowed to the combustion chambers.

Notwithstanding the availability of the above systems, scientists and engineers continue to seek yet improved cooling systems which have minimal adverse effect upon the efficiency of the operating engine.

DISCLOSURE OF INVENTION

According to the present invention, working medium gases from the fan stream of a turbofan gas turbine engine are flowed from the fan duct to a heat exchanger located remotely of the fan duct to provide supplemental cooling of a fuel cooled electrical generator under conditions of low fuel flow.

In accordance with one specific embodiment of the invention, cooling air from the second heat exchanger is discharged through a nacelle core compartment to ventilate the compartment at low power operation.

Primary features of the present invention are the rejection of excess generator heat at moderate and high fuel flow rates to the engine fuel and the combined rejection of excess generator heat at low fuel flow rates to engine fuel and working medium gases. A primary heat exchanger located in a nacelle compartment provides heat transfer communication between the fluid generator cooling system and the fuel of the fuel supply system. A secondary heat exchanger disposed in a nacelle compartment remotely from the fan stream transfers heat from the fluid of the generator cooling system air from the fan bypass duct. Other features include a conduit for cooling air extending between the fan bypass duct and the inlet to the secondary heat exchanger and a valve for turning on the flow of air through the secondary heat exchanger at low engine power. In one specific embodiment, the secondary heat exchanger is between the fluid outlet of the electrical generator and the fluid inlet of the fluid-to-fuel heat exchanger. In another specific embodiment the air side of the secondary heat exchanger is in gas communication with the core compartment of the engine.

A principal advantage of the present invention is the improved match of generator heat load to engine cooling capacity. Reliance upon the cooling capacity of engine fuel to provide primary cooling of the generator eliminates the need for a large heat exchanger in the fan duct. Augmentation of the fuel cooling capacity at low fuel flow rates is achieved with a relatively small heat exchanger utilizing fan air, but located remotely from the fan duct. Improved engine efficiency results from avoiding flow losses caused by a heat exchanger for the cooling system intruding into the working medium flow path. A further efficiency results from avoiding at high power the flow distortion associated with withdrawing air from the working medium flow path by only withdrawing the air at low power. In one embodiment, the nacelle core compartment is ventilated at low power without further decreasing engine efficiency by discharging air from the secondary heat exchanger into the core compartment. In another embodiment, effectiveness of the secondary heat exchanger is increased by flowing the heated cooling fluid in the cooling system first to the secondary heat exchanger to establish the greatest temperature difference between the cooling fluid and the air.

The foregoing and other objects, features and advantages of the present invention will become more apparent in the light of the following detailed description of the preferred embodiment thereof as shown in the accompanying drawing.

BEST MODE FOR CARRYING OUT THE INVENTION

Figure 1:
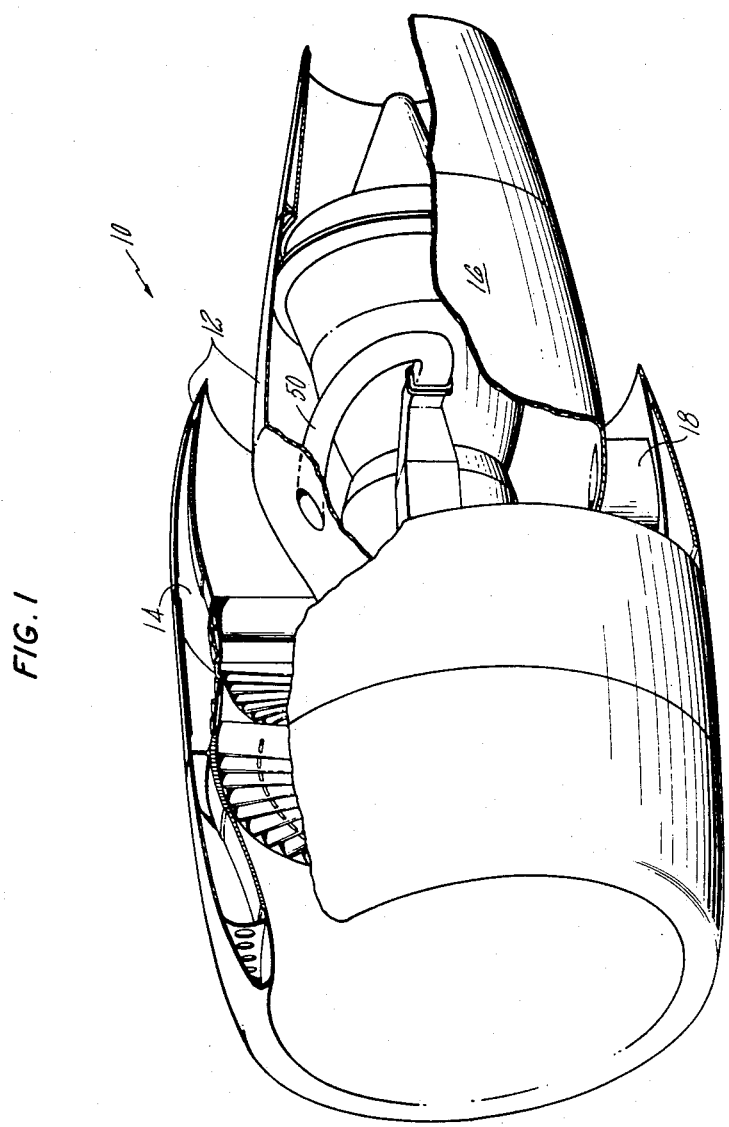
FIG. 1 is a partial perspective view of an axial flow gas turbine engine of the turbofan type mounted in an aircraft nacelle with a portion of the fan compartment and the core compartment broken away to show portions of the engine and accessory equipment.

A gas turbine engine 10 of the axial flow, turbofan type is shown in FIG. 1. A nacelle 12 circumscribes the engine. The nacelle includes compartments for housing auxiliary equipment such as a nacelle fan compartment 14 and a nacelle core compartment 16. The nacelle is adapted to both support and position the engine from a support structure such as an aircraft wing.

The engine is formed of a fan section 20, a compressor section 22, a combustion section 24 and a turbine section 26. A primary flow path 28 for working medium gases extends rearwardly through these sections of the engine. The nacelle core compartment extends circumferentially about the engine and is spaced radially inwardly from the fan compartment 14 leaving a fan bypass duct 30 therebetween. A secondary flow path 32 for working medium gases extends rearwardly through the bypass duct.

Figure 2:
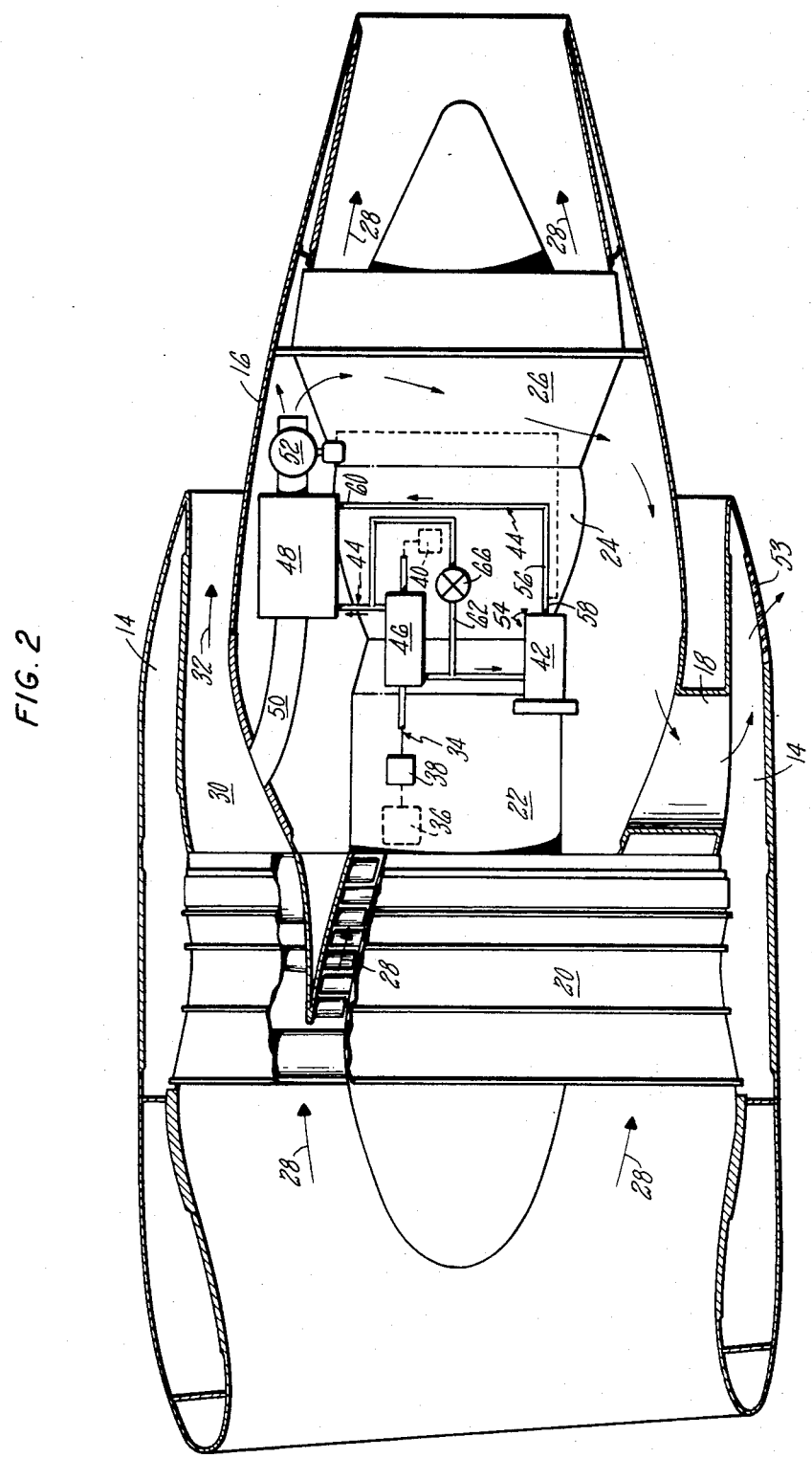
FIG. 2 is a diagrammatic illustration of the primary flow path, the secondary flow path of the gas turbine engine and a portion of the accessory equipment disposed in a nacelle core compartment about the gas turbine engine.

As shown diagrammatically in FIG. 2, a fuel supply system 34 includes a fuel tank 36, a fuel control 38 for controlling the rate of flow of the fuel and a means for injecting fuel into the primary flow path 28 of the engine as represented by a single fuel nozzle 40. The fuel tank is typically disposed in the wing of the aircraft; the fuel control is disposed in the core compartment; and the fuel nozzles are disposed in the combustion chamber of the engine.

The core compartment also houses an electrical generator 42 for supplying electric power to the aircraft at a constant frequency. The electrical generator is driven by the gas turbine engine. A cooling system 44 includes a means, such as a primary heat exchanger 46, for transferring heat from the cooling fluid to fuel in the fuel supply system 34.

The cooling system 44 also includes a means, such as a secondary heat exchanger 48 for transferring heat from the cooling fluid to cooling air. The secondary heat exchanger is disposed in one of the nacelle compartments such as the core compartment 16. A means for flowing working medium gases from the fan bypass duct through the secondary heat exchanger, such as a conduit 50, extends between the fan bypass duct 30 and the secondary heat exchanger to place the secondary heat exchanger in gas communication with a source of cooling air such as the secondary working medium flow path 32 of the engine. A means for regulating the fan air flow through the conduit 50, such as a valve 52, is responsive to the temperature of the cooling fluid in the cooling system at the point of discharge from the electrical generator. The outlet of the cooling air side of the secondary heat exchanger is also in gas communication with a nacelle core compartment. In turn, the nacelle core compartment is in gas communication with the atmosphere through the hollow strut 18 extending between the core compartment and the fan compartment and through openings 53 in the fan compartment.

A means 54 for circulating the cooling fluid in the cooling system 44 includes a conduit 56 and a pump (not shown). For example, the pump may be a gear pump formed integrally with the electrical generator and driven by the gas turbine engine. The means for circulating the cooling fluid is used to place the cooling fluid in fluid and heat transfer communication with the primary heat exchanger 46, the electrical generator and the secondary heat exchanger 48. As shown, the electrical generator has an outlet 58 for the cooling fluid and the secondary heat exchanger has a fluid side inlet 60. A portion of the conduit 56 extending between the electical generator and the secondary heat exchanger places the inlet of the secondary heat exchanger in fluid communication with the outlet of the electrical generator. The means 54 for circulating the cooling fluid includes a bypass conduit 62 connecting the inlet and discharge ports of the primary heat exchanger to prevent the loss of heat from the cooling fluid during low temperature startup of the engine. A means for regulating the flow of cooling fluid through the bypass conduit, such as a valve 66, is responsive to the temperature of the cooling fluid.

Figure 3:
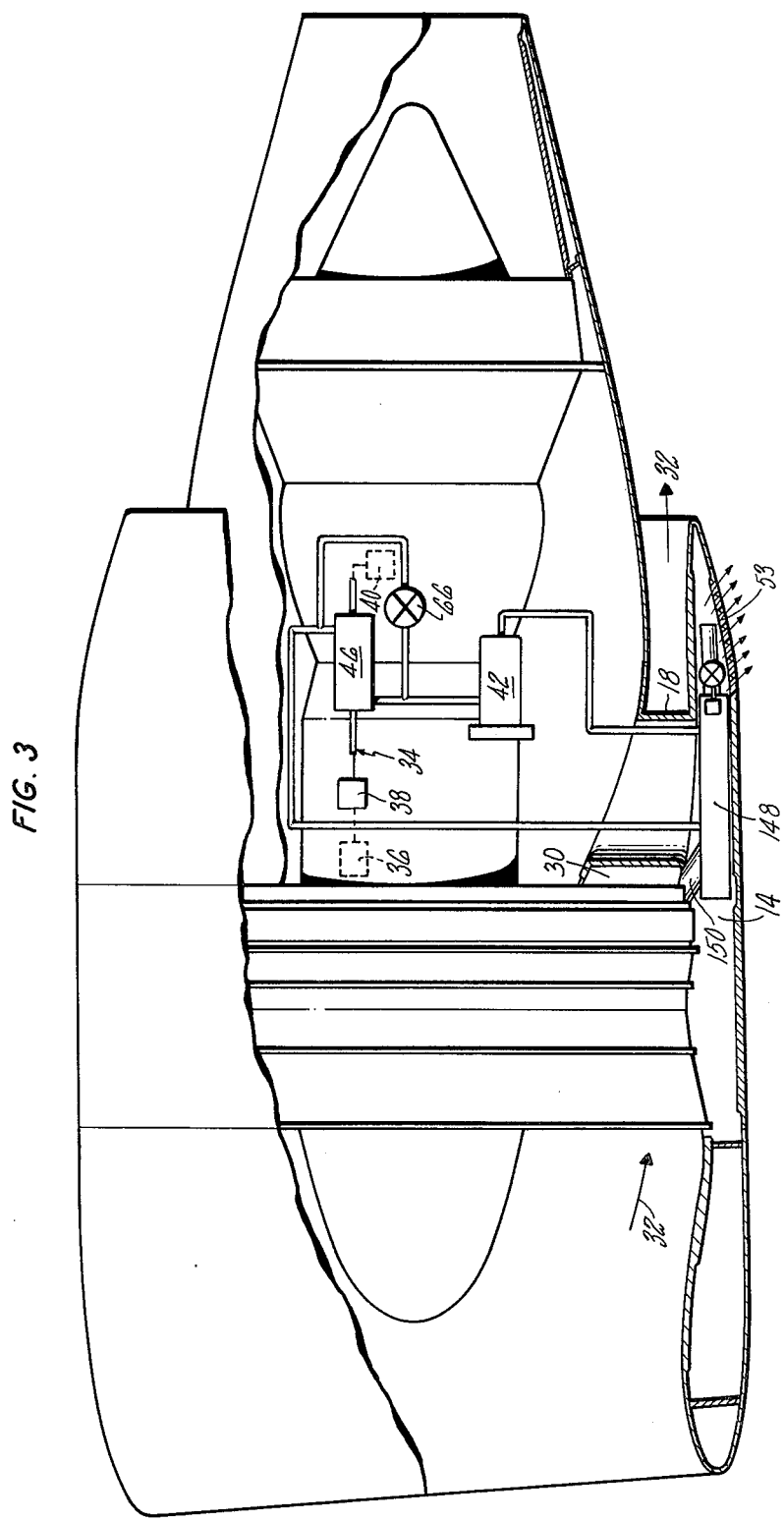
FIG. 3 is a diagrammatic illustration of an alternate embodiment of FIG. 2 showing a portion of the accessory equipment disposed both in a nacelle fan compartment and in a nacelle core compartment about the gas turbine engine.

FIG. 3 is an alternate embodiment of FIG. 2 having a secondary heat exchanger 148 located in the fan compartment 14 of the engine. A conduit 150 extends between the fan bypass duct 30 and the secondary heat exchanger to place the secondary heat exchanger in fluid communication with the source of cooling air such as the secondary flow path 32. The cooling air is discharged from the heat exchanger and exhausted into the nacelle fan compartment 14 and is discharged to atmosphere.

During operation of the gas turbine engine, working medium gases in the form of air are drawn into the gas turbine engine 10. The gases are compressed in the compressor section 22 causing the temperature and pressure of the working medium gases to increase. The gases are flowed to the combustion section where fuel from the fuel tank 36 is injected by the fuel nozzle 40 into the combustion section 24. The fuel and the gases are mixed and burned to increase the temperature of the working medium gases. The gases are expanded through the turbine section 26 of the engine to power the aircraft to which the engine is attached. The engine is also used to drive the electrical generator 42 either through a hydromechanical or a mechanical system to produce electric power for the aircraft at a constant frequency.

The production of electrical power by the electrical generator 42 also results in the production of heat. This heat results primarily from resistance heating of the generator elements and secondarily from mechanical friction and viscous friction associated with operation of the electrical generator and pumping of the cooling fluid. Heat is transferred to the cooling fluid which is flowed through the cooling system 44. This cooling fluid is preferably the lubricating oil for the electrical generator. After the cooling fluid is flowed through the electrical generator, the heat from the cooling fluid is rejected under high power operating conditions to the combustion fuel in the fuel supply system being flowed to the fuel nozzles 40. As will be realized, the high fuel flow rates occurring at high power operation are many times greater than the low fuel flow rates occurring at low power operation.

At low power operation, the flow rate of combustion fuel passing through the primary heat exchanger 46 in the fuel line is much reduced as compared with high power operation. The amount of heat produced by the electrical generator at low power does not decrease because the amount of heat is a function of the amount of electrical power consumed by the aircraft. As a result the fuel cannot remove all of the heat required to be removed from the cooling fluid in the cooling system. The valve 52, responsive to the increasing temperature of the cooling fluid, opens allowing cooling air to flow from the fan bypass duct through the secondary heat exchanger. The air removes heat from the cooling fluid enabling a safe operation of the electrical generator. Because the secondary heat exchanger removes only the amount of heat that is not removed by the primary heat exchanger at low power, the size of the secondary heat exchanger is reduced as compared with those configurations relying on a cooling air heat exchanger to remove substantially all of the heat from the cooling fluid. This results in a secondary heat exchanger of a size that is locatable in a nacelle compartment and accordingly avoids the flow losses associated with a heat exchanger for the cooling system that intrudes into the secondary flow path 32 for working medium gases. In addition, use of the secondary heat exchanger enables the fluid cooling system to reject a sufficient amount of heat at low power operating conditions through the secondary and primary heat exchanger to enable use of the fuel cooled heat exchanger as the primary heat exchanger. Without the secondary heat exchanger absorbing sufficient heat at low fuel flows, the primary heat exchanger would increase greatly in size such that a fuel cooled primary heat exchanger would no longer be practicable.

At low power, as shown in FIG. 2, cooling air is exhausted from a secondary heat exchanger through the core compartment 16. This is especially helpful at ground idle operation preparatory to take-off. The cooling air flowed through this compartment ventilates the compartment and removes any noxious or flammable fumes that might arise during operation of the engine. These fumes are swept through the compartment and overboard by the cooling air. During flight operation of the aircraft, these noxious fumes are of less concern because of the infiltration of air which results from the passage of the aircraft through the atmosphere.

Although the invention has been shown and described with respect to preferred embodiments thereof, it should be understood by those skilled in the art that various changes and omissions in the form and detail thereof may be made therein without departing from the spirit and the scope of the invention.

We claim:

1. A method using a primary heat exchanger and a secondary heat exchanger for removing heat from the cooling fluid of an electrical generator for a turbofan, gas turbine engine, the engine using fuel and operating at a first operating condition in response to a first fuel flow rate and operating at a second operating condition in response to a second fuel flow, the second fuel flow rate being less than the first fuel flow and occurring at low power operation of the engine, the engine having a flow path for working medium gases, the engine being mounted in a nacelle having at least one nacelle compartment, the nacelle having a fan bypass duct through which the flow path for working medium gases extends, comprising the steps of:
   transferring heat from the cooling fluid to engine fuel at the primary heat exchanger at the first operating condition and the second operating condition;
   preventing the flow of working medium gases from the fan bypass duct to the secondary heat exchanger at the first operating condition;
   flowing working medium gases from the fan bypass duct to a secondary heat exchanger at a location remote from the engine flow path at the second operating condition;
   transferring heat from the cooling fluid to the working medium gases at the secondary heat exchanger at the second operating condition.

2. The method for removing heat from the cooling fluid of an electrical generator for a gas turbine engine as claimed in claim 1 wherein at least one nacelle compartment is a nacelle core compartment and wherein the step of flowing working medium gases includes the step of flowing air from the secondary heat exchanger through the nacelle core compartment to ventilate the core compartment.

3. In a cooling system of the type using a cooling fluid to cool an electrical generator of a turbofan, gas turbine engine, the engine using fuel and operating at a first operating condition in response to a first fuel flow rate and operating at a second operating condition in response to a second fuel flow rate, the second fuel flow rate being less than the first fuel flow rate, the engine having a flow path for working medium gases, the engine being mounted in a nacelle having at least one nacelle compartment, the nacelle having a fan bypass duct through which the flow path for working medium gases extends, the improvement which comprises:
   a primary heat exchanger disposed in a compartment of the nacelle for transferring heat between the cooling fluid of the cooling system and the engine fuel;
   a secondary heat exchanger disposed in a compartment of the nacelle for transferring heat from the cooling fluid of the cooling system to working medium gases from the fan bypass duct of the engine;
   means for circulating the cooling fluid through the electrical generator, the primary heat exchanger and the secondary heat exchanger;
   means for flowing fuel through the primary heat exchanger to absorb heat from the cooling fluid of the generator cooling system at the first operating condition and the second operating condition;
   means for flowing working medium gases from the fan bypass duct through the secondary heat exchanger; and, means responsive to engine operating conditions for regulating the flow of working medium gases through the secondary heat exchanger to prevent the flow of working medium gases through said heat exchanger at the first operating condition of the engine and to permit the flow of gases through said heat exchanger at the second operating condition of the engine.

4. The fluid cooling system of claim 3 wherein the working medium fluid is air and wherein one nacelle compartment is a nacelle core compartment having an exhaust means, wherein the secondary heat exchanger has an air side and a fluid side in heat transfer communication and wherein the air side is in gas communication with the nacelle core compartment such that fan air flowing from the fan bypass duct through the secondary heat exchanger at the second operating condition ventilates the nacelle core compartment.

5. The fluid cooling system of claim 1 or 2 wherein the electrical generator has an outlet for the cooling fluid and wherein the fluid side of the secondary heat exchanger has an inlet and wherein a conduit extending between the electrical generator and the secondary heat exchanger places the inlet of the secondary heat exchanger in fluid communication with the outlet of the electrical generator.

* * * * *